(12) United States Patent  
Sakurai et al.

(10) Patent No.: US 8,264,648 B2
(45) Date of Patent: Sep. 11, 2012

(54) IMPACT RESISTANT ELECTRO-OPTICAL MODULE AND ELECTRONIC DEVICE

(75) Inventors: Shinji Sakurai, Matsumoto (JP); Ryosuke Imaseki, Shiojiri (JP)

(73) Assignee: Sony Corporation, Tokyo (JP)

( * ) Notice: Subject to any disclaimer, the term of this patent is extended or adjusted under 35 U.S.C. 154(b) by 710 days.

(21) Appl. No.: 11/467,650

(22) Filed: Aug. 28, 2006

(65) Prior Publication Data

US 2007/0046873 A1 Mar. 1, 2007

(30) Foreign Application Priority Data

Aug. 29, 2005 (JP) ................................. 2005-247234
May 29, 2006 (JP) ................................. 2006-147712

(51) Int. Cl.
*G02F 1/1333* (2006.01)
*C09K 19/00* (2006.01)

(52) U.S. Cl. ............. 349/122; 349/60; 428/1.3; 428/1.5
(58) Field of Classification Search ................... 349/12, 349/58, 60, 96, 122; 428/1.3, 1.5, 41.7, 42.3
See application file for complete search history.

(56) References Cited

U.S. PATENT DOCUMENTS

| 5,587,816 A * | 12/1996 | Gunjima et al. ................. 349/62 |
| RE37,377 E | 9/2001 | Gunjima et al. |
| RE38,305 E | 11/2003 | Gunjima et al. |
| 6,654,083 B1 * | 11/2003 | Toda et al. ..................... 349/110 |
| 7,019,801 B2 | 3/2006 | Ueki et al. |
| 7,151,580 B2 | 12/2006 | Ueki et al. |
| 7,163,739 B2 * | 1/2007 | Koike et al. ................... 428/343 |
| 7,209,196 B2 * | 4/2007 | Saiki et al. ...................... 349/96 |
| 7,253,852 B2 * | 8/2007 | Roberts et al. .................. 349/58 |
| 2002/0186461 A1 * | 12/2002 | Saiki et al. ..................... 359/352 |
| 2002/0191127 A1 * | 12/2002 | Roberts et al. .................. 349/61 |
| 2004/0180148 A1 * | 9/2004 | Hieda et al. .................... 428/1.1 |
| 2005/0024890 A1 * | 2/2005 | Yamamoto et al. ........... 362/555 |
| 2005/0100820 A1 * | 5/2005 | Satake et al. ............... 430/271.1 |
| 2006/0072054 A1 * | 4/2006 | Ito .................................. 349/96 |

FOREIGN PATENT DOCUMENTS

| JP | 06-337413 | 12/1994 |
| JP | 11-142630 | 5/1999 |
| JP | 11-174417 | 7/1999 |
| JP | 2000-284270 | 10/2000 |
| JP | 2001-266759 | 9/2001 |
| JP | 2002-214603 | 7/2002 |
| JP | 2003-249181 | 9/2003 |

* cited by examiner

*Primary Examiner* — Mark Robinson
*Assistant Examiner* — Paisley L Arendt
(74) *Attorney, Agent, or Firm* — K&L Gates LLP

(57) ABSTRACT

An electro-optical module includes: an electro-optical panel; and a transparent protector disposed on a viewer-side surface of the electro-optical panel, wherein transparent protector has a stack structure including a first transparent protection layer that faces the electro-optical panel and is formed of an elastic material and a second transparent protection layer that has a higher dynamic elasticity value than that of the first transparent protection layer within a frequency range of 1 to 10 Hz.

12 Claims, 6 Drawing Sheets

IMPACT RESISTANT ELECTRO-OPTICAL MODULE AND ELECTRONIC DEVICE

This application claims the benefit of Japanese Patent Application No. 2005-247234, filed Aug. 29, 2005 and Japanese Patent Application No. 2006-147712, filed May 29, 2006. The entire disclosure of the prior applications is hereby incorporated by reference herein in its entirety.

BACKGROUND

1. Technical Field

The present invention relates to an electro-optical module and an electronic device, and more particularly, to a construction for improving impact resistance of an electro-optical module.

2. Related Art

In general, electro-optical modules such as a liquid crystal display unit, an organic luminescence display unit, and a plasma display unit are widely used as a display module. These modules typically have a glass panel, a plastic panel, or the like. When these modules are externally impacted, the glass panel may be cracked, or the plastic panel may be deformed, and finally the display unit may be broken down.

In a chassis frame of an electronic device having such an electro-optic module, a gap is provided between a window fixed at the chassis frame and a viewer-side surface of a liquid crystal panel in order to prevent the external impact applied to the window from being directly transmitted to the liquid crystal panel.

Nevertheless, when portable electronic devices such as a mobile phone or a personal digital assistant (PDA) having a miniaturized display unit are used in a practical case, the display unit may be frequently impacted by something or dropped to the ground, so that the its display unit may be completely unrecoverably damaged in some cases.

In order to prevent the damage in the display unit, JP-A-11-174417 and JP-A-2000-284270 disclose a construction for retaining the liquid crystal display panel by inserting transparent elastic resin for the transparent member, a construction for providing an extension around a polarization film to be extended outwardly with respect to the liquid crystal panel and supporting the extension by supports of the chassis frame, or the like.

However, in the aforementioned support structures of the liquid crystal display panel, the liquid crystal panel is supported by the transparent material disposed at its viewer side. Therefore, it may be impossible to obtain a strength for supporting the liquid crystal panel if the transparent material does not have an appropriate degree of stiffness. As a result, it is impossible to obtain sufficient impact absorption, and impact resistance is also limitedly improved.

In the above support structures, the transparent material should have a sufficient thickness in order to obtain impact absorption. In addition, there should be a space behind the liquid crystal panel in order to support the liquid crystal panel by using only the polarization film. Therefore, the thickness of an electronic device having the liquid crystal panel cannot be sufficiently reduced.

SUMMARY

An advantage of the invention is that it provides an electro-optical device having improved impact resistance and a thin thickness and an electronic device having the same.

According to an aspect of the invention, there is provided an electro-optical module including an electro-optical panel and a transparent protector disposed on a viewer-side surface of the electro-optical panel. The transparent protector has a stack structure including a first transparent protection layer that faces the electro-optical panel and is formed of an elastic material and a second transparent protection layer that has a higher dynamic elasticity value than that of the first transparent protection layer within a frequency range of 1 to 10 Hz.

In this case, since the transparent protector has a stack structure including a first transparent protection layer and a second transparent protection layer that has a higher dynamic elasticity value than that of the first transparent protection layer, external impact can be diffused in the second transparent protection layer, and the stress diffused in the second transparent protection layer can be absorbed in the first transparent protection layer. Therefore, it is possible to more safely protect the electro-optical panel.

Impact resistance of the electro-optical panel may be improved 20% or higher per a thickness of 0.1 mm of the transparent protector in comparison with that of the electro-optical panel which is not combined with the transparent protector. Since the impact resistance of the electro-optical panel may be improved 20% or higher per a thickness of 0.1 mm of the transparent protector in comparison with a reference value of the impact resistance (of the electro-optical panel which is not combined with the transparent protector), it is possible to remarkably improve impact resistance in comparison with a known structure in which a gap is provided between the window and the electro-optical panel as well as produce a thinner display unit.

In other words, in the known structure in which a gap is provided between the window and the electro-optical panel, the gap is indispensable in order to obtain rigidity of the window and allow the window not to directly make contact with the electro-optical panel. Therefore, it was impossible to reduce a total thickness including the thickness of the window and the gap between the window and the electro-optical panel. Specifically, if the thickness of the window is reduced, the window may be remarkably bent or deformed when it is damaged, so that the gap should be increased. On the contrary, if the gap is reduced, the thickness of the window should be increased in order to reduce the amount of deformation when it is damaged. As a result, it is difficult to make the thickness to be thinner in both cases.

Meanwhile, in a known support structure using a transparent member and a transparent elastic material, it is necessary to support the liquid crystal display panel to the transparent member by interposing the transparent elastic material therebetween. Therefore, a mechanical strength for providing rigidity required in the transparent elastic material should be obtained, and it is difficult to improve impact resistance as well as provide a thinner display unit. In addition, since there has been no specification for the thicknesses of the transparent member and the transparent elastic material, an effective technique for improving impact resistance as well as providing a thinner display unit has not been known in the art.

In the invention, the stack structure including the first and second transparent protection layers prevents the impact from being transmitted to the electro-optical panel. Therefore, it is possible to maximize the amount of impact absorption per a unit thickness by adjusting the thicknesses or the elasticity values of the first and second transparent protection layers. Specifically, the second transparent protection layer may diffuse the stress concentrated by the impact, and the first transparent protection layer may absorb the stress, so that the influence of the impact can be effectively reduced. Particularly, if the impact resistance is improved 20% or higher per a thickness of 0.1 mm of the transparent protector, it is possible to obtain sufficiently high impact resistance even in a thinner structure in comparison with the known structure that uses a window. As a result, it is possible to improve impact resistance as well as provide a thinner display unit.

A dynamic elasticity value of the first transparent protection layer may be ranged between 0.01 MPa and 0.1 GPa, and a dynamic elasticity value of the second transparent protection layer may be ranged between 1.0 and 15.0 GPa within a frequency range of 1 to 10 Hz. As a result, it is possible to effectively obtain sufficiently high impact resistance as well as remarkably reduce a total thickness in applications such as a mobile phone.

In addition, the thickness of the first transparent layer may be ranged between 0.1 mm and 0.8 mm, and the thickness of the second transparent layer may be ranged between 0.1 mm and 0.5 mm. As a result, it is possible to significantly improve impact resistance even in the same or reduced thickness. However, if the thickness of either of the first and second transparent protection layers is below 0.1 mm, it is difficult to practically obtain impact resistance effectiveness.

According to another aspect of the invention, there is provided an electro-optical module including an electro-optical panel and a transparent protector disposed on a viewer-side surface of the electro-optical panel, wherein the transparent protector has a stack structure including a first transparent protection layer that faces the electro-optical panel and is formed of an elastic material and a second transparent protection layer that has a higher dynamic elasticity value than that of the first transparent protection layer within a frequency range of 1 to 10 Hz, wherein a dynamic elasticity value of the first transparent protection layer is ranged between 0.01 MPa and 0.1 GPa, and a dynamic elasticity value of the second transparent protection layer is range between 1.0 and 15.0 GPa within a frequency range of 1 to 10 Hz, and wherein a thickness of the first transparent layer is ranged between 0.1 mm and 0.8 mm, and a thickness of the second transparent layer is ranged between 0.1 mm and 0.5 mm.

In this case, the improvement ratio of the impact resistance per a unit thickness of the transparent protector can be increased. Therefore, it is possible to improve impact resistance as well as provide a thinner display unit.

In addition, the thickness of the first transparent layer may be set to be not larger than 0.4 mm. In this case, it is possible to remarkably improve impact resistance as well as significantly reduce the thickness of the display unit.

In each of the aforementioned aspects of the invention, the electro-optical module may further include an illumination unit arranged at the rear of the electro-optical panel, wherein the illumination unit includes a light source, a light guide panel that introduces a light beam from the light source to output it through a light-emitting surface, and a prism sheet interposed between the light-emitting surface of the light guide panel and the electro-optical panel, and wherein the prism sheet has a prismatic structure protruded toward the light guide panel. In this case, since the prism sheet has the prismatic structure protruded toward the light guide panel, the prismatic structure is resistant to cracks when it is impacted from a viewer side. Therefore, it is possible to reduce influence on display quality from the damage of the prismatic structure.

In addition, the electro-optical module may further include an illumination unit arranged at the rear of the electro-optical panel, wherein the illumination unit includes a light source, a light guide panel that introduces a light beam from the light source to output it through a light-emitting surface, and a prism sheet interposed between the light-emitting surface of the light guide panel and the electro-optical panel, and wherein a surface coat having higher hardness than that of the prismatic structure is formed on at least an apex portion of the prismatic structure of the prism sheet. In this case, since the prismatic structure is resistant to damage due to the surface coat when it is impacted from a viewer side, it is possible to reduce influence on display quality from damage of the prismatic structure. The surface coat may be formed of acrylate based resin, silicon based resin, or inorganic glass. This construction may be more effective when the prism sheet has a prismatic structure protruded toward the electro-optical panel.

In addition, the electro-optical module may further include a peelable layer that is formed between the electro-optical panel and the first transparent protection layer to easily remove the first transparent protection layer. In this case, since the first transparent protection layer can be easily removed from the electro-optical panel due to a peeling property of the peelable layer, it is possible to re-bond the transparent protection layer even when it is deformed or misaligned. Particularly, if the first transparent protection layer is bonded to the electro-optical panel using an adherent property of itself, it is difficult to control the adherent property of the first transparent protection layer because impact absorption is most importantly considered in the first transparent protection layer. Therefore, it is more effective that a separate peelable layer is provided on the electro-optical panel. The peelable layer may be formed of fluorinated resin such as polytetrafluoroethylene (PTFE), silicon based resin, or the like. Alternatively, acrylic or urethane based resin may be used if its water contact angle is not less than 93°.

According to still another aspect of the invention, there is provided an electronic device comprising the aforementioned electro-optical module and a controller for controlling the electro-optical module. The electronic device according to the invention is not limited to any particular type, but may be embodied in various kinds of devices such as a computer or a television set. Particularly, it would be more effective when the invention is embodied in portable electronic devices such as an electronic watch, a portable computer, a personal digital assistant, and a mobile phone. In addition, the transparent protector of the electro-optical module may be provided on an outer surface. In this case, it is possible to most effectively absorb impact in the transparent protector.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
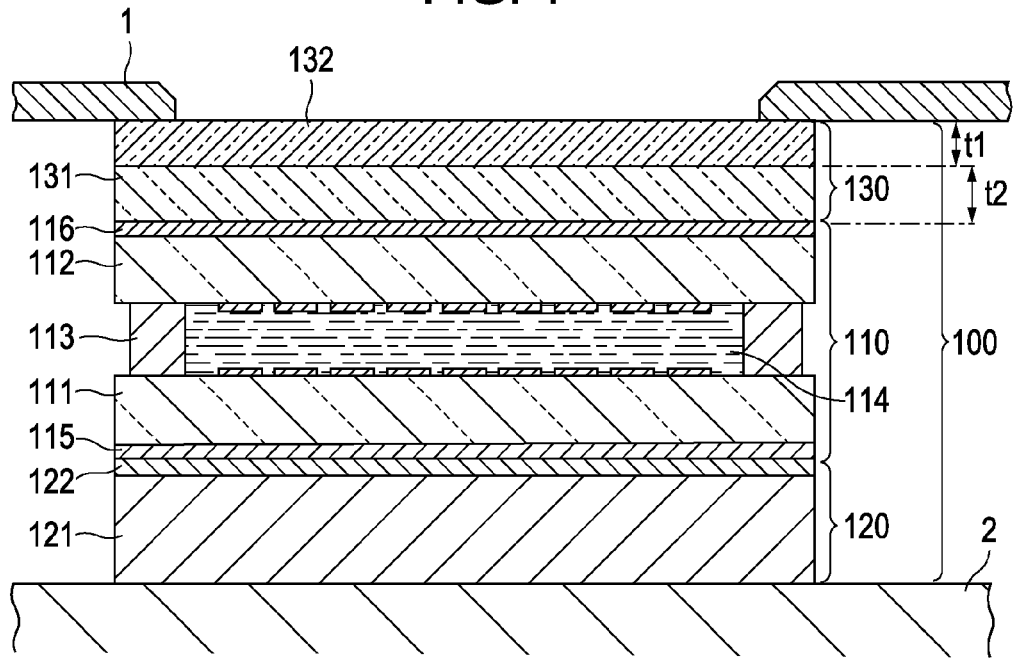
FIG. 1 is a schematic vertical cross-sectional view illustrating an electro-optical module installed in a chassis frame of an electronic device according to an embodiment of the invention.
Figure 2:
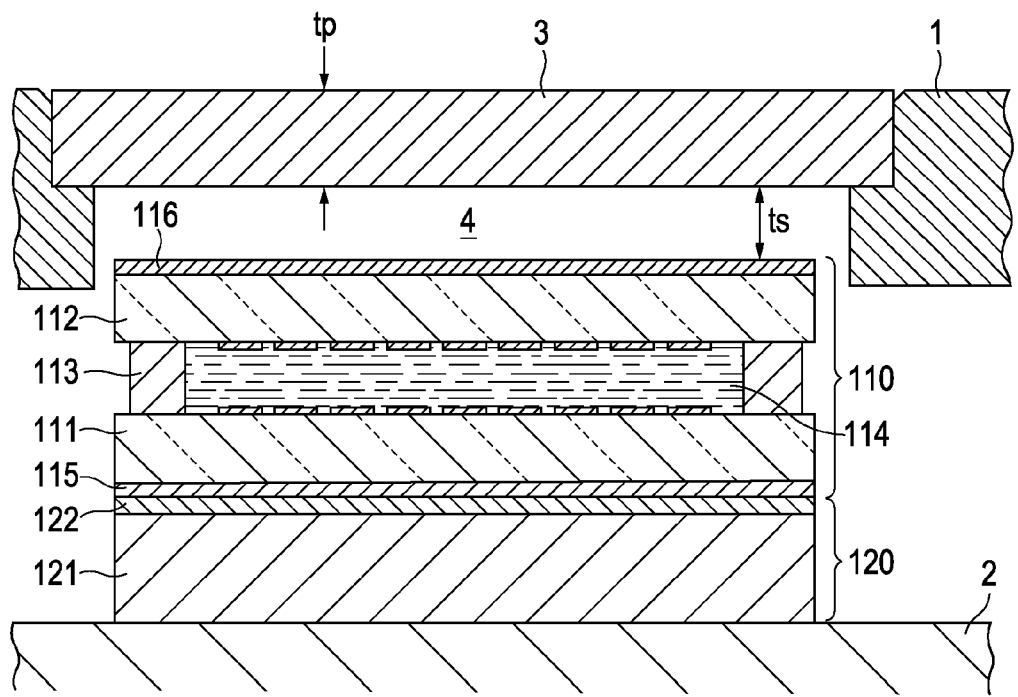
FIG. 2 is a schematic vertical cross-sectional view illustrating an electro-optical module installed in a chassis frame of an electronic device as a comparison example.

Hereinafter, embodiments of the invention will be described in detail with reference to the accompanying drawings. Firstly, an entire construction according to an embodiment of the invention will be described by exemplifying one of known constructions as a comparison example. FIG. 1 is a cross-sectional view schematically illustrating an electro-optical module according to an embodiment of the invention, which is installed in a chassis frame of an electronic device. FIG. 2 is a cross-sectional view schematically illustrating a state-of-the-art electro-optical module installed in a chassis frame of an electronic device as a comparison example.

Referring to FIG. 2 which shows a comparison example, an electro-optical module including a liquid crystal display panel 110 used as an electro-optical panel and an illumination unit 120 (such as a back-light unit) disposed at the rear of the liquid crystal display panel 110 is fixed on a board 2 installed in a chassis frame 1 of an electronic device. The liquid crystal display panel 110 is formed by bonding transparent panels 111 and 112 made of glass or plastic using a sealant 113 with a liquid crystal material 114 as an electro-optical material being inserted therebetween. A plurality of electrodes are provided on each facing inner surfaces of the transparent panels 111 and 112. Each intersection between these electrodes constitutes a pixel which can independently control its display appearance. Polarization films 115 and 116 are provided on the outer surfaces of the transparent panels 111 and 112, respectively.

The transparent panels 111 and 112 may have a thickness of 0.3 to 1.2 mm if they are formed of, for example, inorganic glass. Recently, the transparent panel having a reduced thickness of 0.3 to 0.8 mm is widely used due to necessity of a thinner panel, and the thickness is expected to be more reduced in future.

In addition to the liquid crystal display panel, other display units such as an organic luminescent panel, an electrophoresis display panel, and a field emission display panel may be used as the electro-optical panel. Various kinds of driving methods or electro-optical characteristics can be adopted in the liquid crystal display panel. For example, from the viewpoint of a driving method, the liquid crystal display panel may be a simple matrix type liquid crystal display panel which does not use a switching element for driving a pixel, a static matrix type liquid crystal display panel, or an active matrix type liquid crystal display panel that uses a tri-terminal switching element such as a TFT or a two-terminal switching element such as MIM. From the viewpoint of an electro-optical characteristic, the liquid crystal display panel may be a twisted nematic (TN) type, a super twisted nematic (STN) type, a guest-host type, a phase change (PC) type, a ferroelectric type, or the like.

On the other hand, the illumination unit 120 includes a lighting unit 121 and an optical sheet 122 (including either of a light-collecting sheet or a light-diffusing sheet) disposed on a light-emergent surface of the lighting unit 121. For example, a side-light type unit may be used as the lighting unit 121. In this case, a light source such as a light-emitting diode (LED) or a cold-cathode tube is arranged at an end side, and the light emitted from the light source is propagated from an end side surface through a light-guide provided in the lighting unit 121 to output the light to the light-emergent surface.

In the comparison example of FIG. 2, a transparent window 3 is fixed at a chassis frame 1 at a viewer side of the liquid crystal display panel 110, and a predetermined interval of gap 4 is provided between the window 3 and the liquid crystal display panel 110. The interval of the gap 4 is determined such that the liquid crystal display panel 110 does not make contact with the window 3 or the chassis frame 1 even when they are deformed by external impact. Typically, the window 3 has a thickness tp of 0.8 mm, and the interval ts of the gap 4 is set to 0.5 to 2.0 mm.

On the contrary, according to an embodiment of the invention shown in FIG. 1, a transparent protector 130 is additionally provided on a viewer-side surface of the liquid crystal display panel 110 having a construction similar to that shown in FIG. 2. The transparent protector 130 has a stack structure including a first transparent protection layer 131 disposed at the side of the liquid crystal display panel 110 and a second transparent protection layer 132 disposed at a viewer side against the first transparent protection layer 131.

Referring to FIG. 1, the electro-optical module 100 is supported between the chassis frame 1 and the board 2 provided therein. Specifically, the chassis frame 1 abuts on the surface of the transparent protector 130 to support the electro-optical panel 110 by inserting the transparent protector 130 therebetween. In addition, a cushioning or bushing member such as a gasket is preferably interposed between the chassis frame 1 and the transparent protector 130.

The first transparent protection layer 131 of the transparent protector 130 may be formed of a gel type material such as acryl resin, silicon resin, or an alpha-Gel®. The gel type material preferably has a low dynamic elasticity value within a frequency range of 1 to 10 Hz. For example, the gel type material preferably has a dynamic elasticity value of 0.01 MPa to 0.1 GPa within a frequency range of 1 to 10 Hz in an atmospheric temperature of −10 to 50° C. When the dynamic elasticity value of the first transparent protection layer 131 is below the aforementioned range, it is probable that the deformation in the second transparent protection layer 132 can be directly stressed to the liquid crystal display panel 110 if the thickness of the first transparent protection layer 131 is not sufficient. On the contrary, when the dynamic elasticity value of the first transparent protection layer 131 exceeds the aforementioned range, impact cannot be sufficiently absorbed and may be propagated to the liquid crystal panel 110.

In the transparent protector 130, the first and second transparent protection layers 131 and 132 preferably make contact with each other. In addition, the first transparent protection layer 131 of the transparent protector 130 is preferably adhered to the liquid crystal display panel 110. In this case, the first transparent protection layer 131 preferably has an adherent or gluing property like an adhesive, so that the liquid crystal display panel 110 and the second transparent protection layer 132 can be adhered to each other by the first transparent protection layer 131. As a result, there is no need to separately provide an adhesive or an adherent layer.

Figure 4:
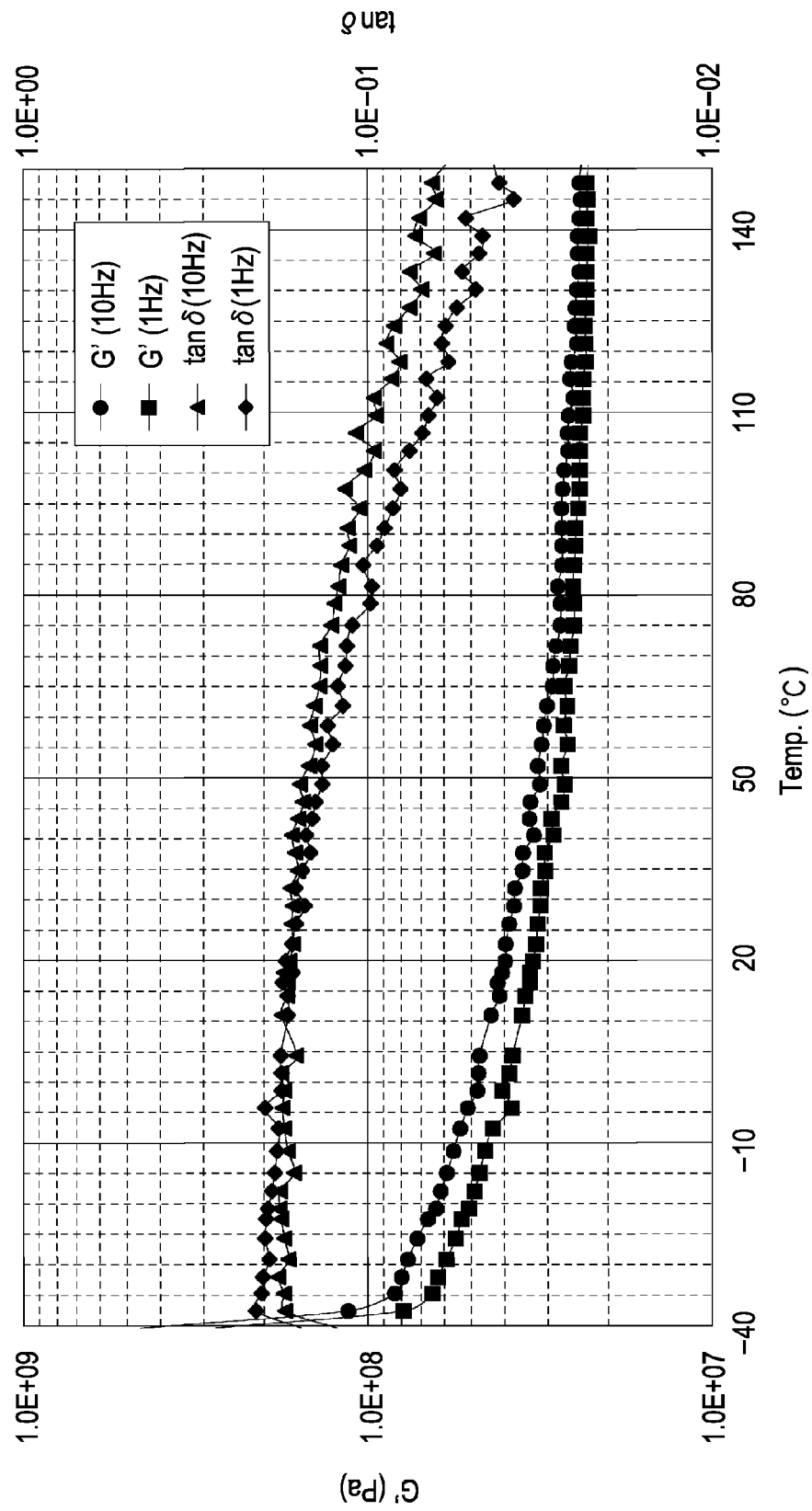
FIG. 4 is a graph for showing viscoelasticity of a material for a first transparent protection layer.

FIG. 4 illustrates a measurement result (including a dynamic elasticity value G' and a loss tangent tan δ) of the dynamic viscoelasticity of an exemplary material (such as a rubber material) for the first transparent protection layer 131 according to an embodiment of the invention. In FIG. 4, a group of circles shows temperature dependence of the dynamic elasticity (or a stored shear elasticity) G' in a frequency range of 10 Hz, a group of rectangles shows temperature dependence of the dynamic elasticity (or a stored shear elasticity) G' in a frequency range of 1 Hz, and a group of triangles shows a loss tangent (or a loss coefficient) tan δ=G"/G', where G" denotes a lossy shear elasticity value.

It is preferable that a material for the first transparent protection layer 131 has a dynamic elasticity value G', corresponding to a stored shear elasticity value of viscoelasticity, within the above range. Also, it is preferable that the lossy shear elasticity value G" is sufficiently large. For example, it is preferable that the loss tangent tan δ which shows a degree of transforming energy to heat is within a range of 0.10 to 1, more preferably, 0.10 to 0.25. When the loss tangent exceeds the above value, deformation generated by an external stress becomes dominant. When the loss tangent is below the above value, impact absorption efficiency may be degraded.

The second transparent protection layer 132 may be formed of acrylic resin, epoxy resin, polyethylene terephthalate, polycarbonate, or other polymer resin materials. It is preferable that a material for the second transparent protection layer 132 has a dynamic elasticity value G' higher than (more preferably, ten times or more) that of the first transparent protection layer 131 within a frequency range of 1 to 10 Hz. For example, the second transparent protection layer 132 may have a dynamic elasticity value of 1.0 to 15.0 GPa within a frequency range of 1 to 10 Hz in an atmospheric temperature of −10 to 50° C. When the dynamic elasticity value of the second transparent protection layer 132 is below the above range, impact cannot be effectively diffused, and the stress is locally concentrated and probably affects the liquid crystal display panel 110. Also, its stiffness may be reduced, and its surface may be easily damaged. On the contrary, when the dynamic elasticity value of the second transparent protection layer 132 exceeds the above range, stress absorption of the first transparent protection layer 131 may be degraded.

Figure 3:
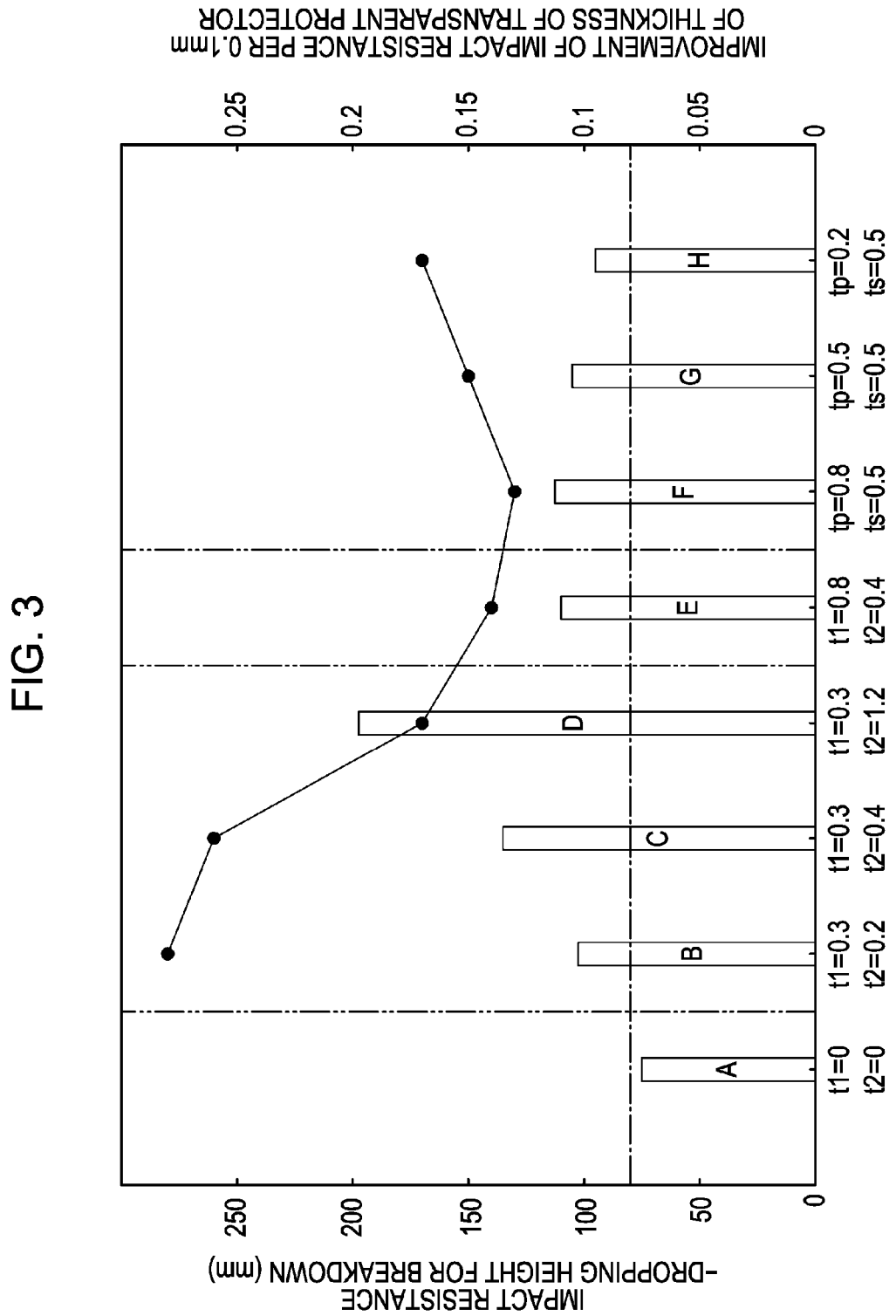
FIG. 3 is a graph for showing impact resistance and its improvement ratio in a reference example, a comparison example, and embodiments of the invention.

FIG. 3 is a graph for comparing impact resistance of a liquid crystal display module according to an embodiment of the invention with that of the comparison example when the dimensions of the liquid crystal display module are changed. The impact resistance was measured in such a way that peripherals of the electro-optical module 100 are supported by edges of the frame, a steel ball having a mass of 250 g is dropped onto the center of the display area of the liquid crystal display panel 110, and a dropping height of the steel ball is measured when the transparent panel 112 of the liquid crystal display panel 110 is cracked.

When the transparent protector 130 is not provided (a reference example A), the dropping height was measured to be 75 mm. In the following embodiments of the invention, this dropping height was used as a parameter for measuring the impact resistance. In comparison with this comparison example A, another measurement was performed as an embodiment B in such a way that the second transparent protection layer 132 is formed of epoxy resin having a dynamic elasticity value of 2.4 to 2.6 GPa and has a thickness of 0.3 mm (t1=0.3 mm), and the first transparent protection layer 131 is formed of a material having characteristics as shown in FIG. 4 and has a thickness of 0.2 mm (t2=0.2 mm).

As a result, the dropping height was measured to be 106 mm. This fact shows that the impact resistance of the embodiment B is increased 41% in comparison with that of the reference example A, and an improvement ratio of the impact resistance of the transparent protector 130 is 0.283 (28.3%) per a thickness of 0.1 mm.

Additionally, another measurement was performed as an embodiment C in such a way that a similar material to that of the embodiment B is used in the transparent protector 130, the second transparent protection layer 132 has a thickness of 0.3 mm (t1=0.3 mm) similarly to the embodiment B, and the first transparent protection layer 131 has a thickness of 0.4 mm (t2=0.4 mm). As a result, the dropping height was measure to be 134 mm in this embodiment C. This fact shows that the impact resistance is improved 79% in comparison with the reference example A, and the improvement ratio of the impact resistance of the transparent protector 130 is 0.255 (25.5%) per a thickness of 0.1 mm.

Additionally, another measurement was performed as an embodiment D in such a way that a similar material to that of the embodiment B is used in the transparent protector 130, the second transparent protection layer 132 has a thickness of 0.3 mm (t1=0.3 mm) similarly to the embodiment B, and the first transparent protection layer 131 has a thickness of 1.2 mm (t2=1.2 mm). As a result, the dropping height was measure to be 195 mm in this embodiment D. This fact shows that the impact resistance is improved 160% in comparison with the reference example A, and an improvement ratio of the impact resistance of the transparent protector 130 is 0.173 (17.3%) per a thickness of 0.1 mm.

Additionally, another measurement was performed as an embodiment E in such a way that the first transparent protection layer 131 is formed of a similar material to that of the embodiment C and has a similar thickness of 0.4 mm (t2=0.4 mm) to that of the embodiment C, and the second transparent protection layer 132 is formed of polymethylmethacrylate (PMMA) having a dynamic elasticity value of 1.5 to 3.3 GPa, more preferably, 3.1 to 3.3 GPa and has a thickness of 0.8 mm (t2=0.8 mm). As a result, the dropping height was measure to be 121 mm in this embodiment E. This fact shows that the impact resistance is improved 61% in comparison with the reference example A, and an improvement ratio of the impact resistance of the transparent protector 130 is 0.134 (13.4%) per a thickness of 0.1 mm.

In all of the above embodiments B, C, D, and E, it can be recognized that the impact resistance is improved in comparison with the reference example A. Specifically, the impact resistance is improved as much as the thickness of the first transparent protection layer 132 is increased assuming that the thickness of the second transparent protection layer 131 is constant. However, it is also recognized that the improvement ratio the impact resistance of the transparent protector 130 per a thickness of 0.1 mm is decreased as the thickness of the first or second transparent protection layer 131 or 132 is increased. More specifically, in the embodiments B and C, although the thickness of the transparent protector 130 is smaller than that shown in FIG. 2, the impact resistance is improved in comparison with that of the reference example A. However, in the embodiment D, the thickness 1.5 mm of the transparent protector 130 is larger than a typical interval 1.3 mm of the gap shown in FIG. 2. Also, in the embodiment E, the thickness 1.2 mm of the transparent protector 130 is nearly the same as a typical interval shown in FIG. 2.

Additionally, another measurement was performed as a comparison example F using an assembly having a smallest thickness (i.e., having a smallest interval ts of the gap 4) among known liquid crystal display modules, in such a way that the window 3 is formed of polyethylene terephthalate and has a thickness of 0.8 mm (tp=0.8 mm), and the interval ts of the gap 4 is set to 0.5 mm (ts=0.5 mm). As a result, the dropping height was measured to be 125 mm. This fact shows that the improvement ratio of the impact resistance is 0.128 (12.8%) per a thickness of 0.1 mm in comparison with the reference example A.

Similarly, another measurement was performed as a comparison example G in such a way that the interval ts of the gap is not changed, and the thickness of the window is reduced to 0.5 mm (tp=0.5 mm). As a result, the dropping height was measured to be 110 mm, and the improvement ratio of the impact resistance was 0.146 (14.6%) per a thickness of 0.1 mm in comparison with the reference example A.

Similarly, another measurement was performed as a comparison example H in such a way that the interval ts of the gap is not changed, and the thickness of the window is reduced to 0.2 mm (tp=0.2 mm). As a result, the dropping height was measured to be 90 mm, and the improvement ratio of the impact resistance was 0.171 (17.1%) per a thickness of 0.1 mm in comparison with the reference example A. Additionally, it was identified that both of the impact resistance and the improvement ratio are degraded when the thickness tp of the window 3 or the interval ts of the gap 4 is further reduced.

As recognized from the aforementioned descriptions, the improvement ratio of the impact resistance per a thickness of 0.1 mm is limited in the vicinity of 17% in a known structure, but is improved to 20% or higher in the embodiments B and C. Since this fact shows that the impact resistance can be improved even when the thickness is limited or reduced, the structure according to the invention has higher performance for the impact resistance in comparison with the convention structure.

According to the embodiments of the invention, when the thickness t2 of the first transparent protection layer 131 is set to 0.1 to 0.8 mm, and the thickness t1 of the second transparent protection layer 132 is set to 0.1 to 0.5 mm, the improvement ratio of the impact resistance of the transparent protector 130 is 20% or more per a thickness of 0.1 mm in comparison with the reference example A. As a result, excellent impact resistance can be obtained even when the thickness of the liquid crystal display module is reduced. In this case, when the thickness t2 of the first transparent protection layer 131 is set to 0.4 mm or less, it is possible to improve the impact resistance as well as reduce the thickness of a display unit.

In order to effectively prevent the crack generated by dropping a mobile device, the dropping height for the impact resistance measurement should be not less than 80 mm, preferably 100 mm, and more preferably 120 mm. Also, the thickness (t1+t2) of the transparent protector 130 should be 1.0 mm, preferably 0.8 mm.

Subsequently, a construction that can be adopted in the embodiments of the invention will be described with reference to FIGS. 5 and 6. This construction particularly relates to the illumination unit 120 for the aforementioned embodiments. Although the illumination unit 120 includes the lighting unit 121 and the optical sheet 122 as described above, the constructions shown in FIGS. 5 and 6 can be used.

Figure 5:
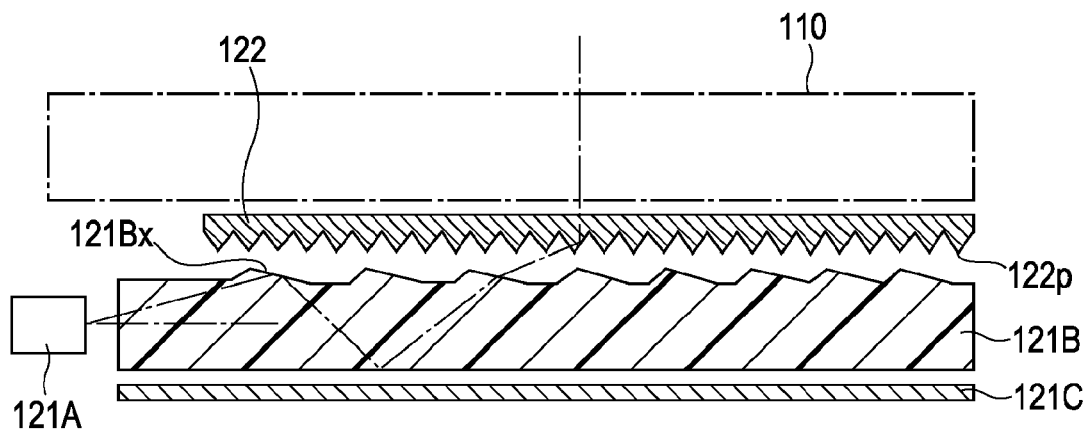
FIG. 5 is a schematic cross-sectional view illustrating an illumination unit according to an embodiment of the invention in detail.

Referring to FIG. 5, the lighting unit 121 has a light source 121A such as an LED or a cold-cathode tube, a light guide panel 121B formed of acrylic resin or polycarbonate resin, and a reflective sheet 121C which is formed of a white polyethylene sheet and disposed at the rear of the light guide panel 121B. The light source 121A faces an end surface of the light guide panel 121B. The light emitted from the light source 121A is incident to the light guide panel 121B from the corresponding end surface, propagated along the light guide panel 121B, and then output from the light-emitting surface 121Bx. In this embodiment shown in FIG. 5, an irregular surface structure is provided in the light-emitting surface 121Bx, and the amount of the emergent light is controlled by irregularity of the irregular surface structure, so that relatively uniform brightness can be obtained across a wide area of the light-emitting surface 121Bx.

A prism sheet 122 which is a kind of optical sheets is provided on the light-emitting surface 121Bx of the light guide panel 121B. The prism sheet 122 collects the light beams emergent from the light guide panel 121B toward an optical axis (a normal line of the light-emitting surface 121Bx) to increase optical efficiency. A prismatic structure 122p having a triangle shape (preferably, a isosceles-triangle shape) protruded toward the light guide panel 121B in its cross-section is periodically formed on the prism sheet 122. The prism sheet 122 having a downwardly-protruded prismatic structure 122p deflects the light beam having a relatively large emergent angle toward the optical axis by virtue of refraction. An apex angle of this prismatic structure 122p is typically set to 60 to 80°.

Since the prism sheet 122 provided above the light guide panel 121B has the prismatic structure 122p protruded toward the light guide panel 121B as described above, it is possible to reduce damage, generated by the impact applied from the transparent protector 130, on the prismatic structure 122p. Reversely, assuming that the prismatic structure 122p has the prism sheet 122 protruded toward the electro-optical panel 110, the electro-optical panel 110 may be directly abutted on the prismatic structure when it was externally impacted, so that the apex of the prismatic structure can be easily damaged. The damage in the apex of the prismatic structure 122p affects the light collecting property of the prism sheet 122, and more particularly, the brightness around the damaged apex is changed in contrast to surrounding portions, so that the display quality of the electro-optical panel can be degraded. However, according to an embodiment of the invention, the prismatic structure 122p is protruded toward the light guide panel 121B. Therefore, it is possible to reduce the damage in the apex of the prismatic structure 122p due to a cushioning effect of the prism sheet 122.

Figure 6:
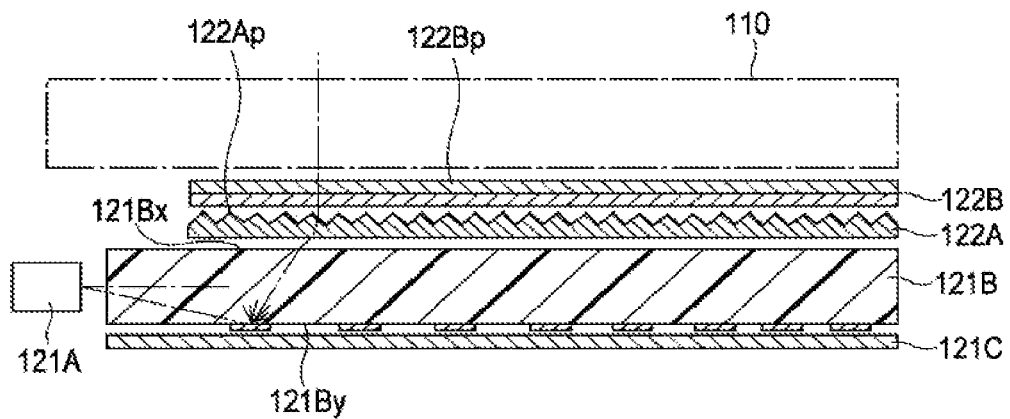
FIG. 6 is a schematic cross-sectional view illustrating an illumination unit according to another embodiment of the invention in detail.

Referring to FIG. 6 which shows another embodiment of the invention, the illumination unit 120 includes a lighting unit having a light source 121A, a light guide panel 121B, a reflective sheet 121C, and prism sheets 122A and 122B as an optical sheet. In this case, although the light-emitting surface 121Bx of the light guide panel 121B is a flat surface, a light-scattering layer is provided on a bottom surface 121By facing the reflective sheet 121C through a printing. Alternatively, an embossing surface structure may be provided on the bottom surface 121By instead of the light-scattering layer.

A prismatic structure 122Ap having a triangle shape (preferably, a isosceles-triangle shape) protruded toward the electro-optical panel 110 in its cross-section is periodically formed on the prism sheet 122A disposed on the light-emitting surface 121Bx of the light guide panel 121B. An apex angle of this prismatic structure 122Ap is typically set to 90°. In addition, another prism sheet 122B may be provided on the surface of prism sheet 122A, facing the electro-optical panel 110. Although the prism sheet 122B has a similar structure 122Bp to the above prismatic structure 122Ap, its tilt direction (a direction normal to a paper surface in FIG. 6) is orthogonal to a tilt direction (a horizontal direction in FIG. 6) of the prismatic surface of the prism sheet 122A.

Figure 7:
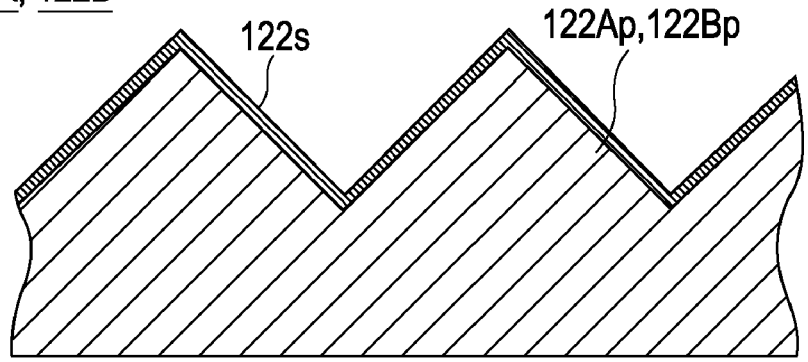
FIG. 7 is an enlarged partial cross-sectional view illustrating a prismatic structure of a prism sheet of FIG. 6.

Referring to FIG. 7, a surface coat (e.g., a hard coat layer) 122s is formed on the prismatic structures 122Ap and 122Bp in the prism sheets 122A and 122B, respectively. Although it has been described that the surface coat 122s is preferably formed on at least the apex portions of the prismatic structures 122Ap and 122Bp, the surface coat 122s may be formed on the entire surface of the prismatic structures 122Ap and 122Bp in a single body. In this case, it is possible to minimize the effect of the surface coat 122s to the optical properties and surely prevent surface damage. The surface coat 122s is formed of a harder material than that of the prismatic structure. A material for the surface coat 122s used as a hard coat may include acrylate based resin such as ester acrylate, oxetane based resin, silicon based resin, an organo-alkoxysilane based material, an alcoxysilane zirconate based material, an inorganic material such as an aqueous silicate or aqueous alumina based material, or the like.

Since the surface coat 122s is provided in at least the apex portion in the prismatic structure, it is possible to reduce a probability of damaging the apex portion of the prismatic structure by the impact propagated from the electro-optical panel 110. Consequently, it is possible to prevent display quality degradation.

Figure 8:
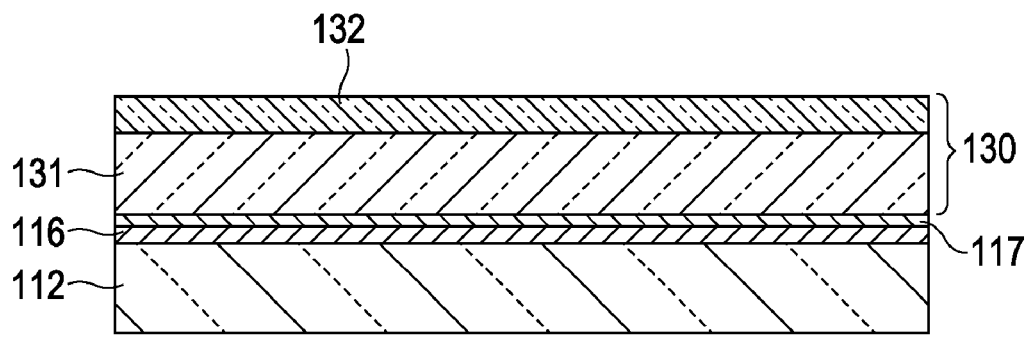
FIG. 8 is a schematic cross-sectional view illustrating a bonding structure between a transparent protector and an electro-optical panel according to an embodiment of the invention.

Subsequently, another exemplary construction that can be adopted in the aforementioned embodiments will be described with reference to FIGS. 8 and 9. This construction relates to a stack structure consisting of the electro-optical panel 110 and the transparent protector 130. Referring to FIG. 8, a peelable layer 117 is formed on the surface of the polarization film 116 bonded to the viewer-side transparent panel 112 of the electro-optical panel 110. The first transparent protection layer 131 of the transparent protector 130 is bonded on the peelable layer 117. The peelable layer 117 is to easily remove the first transparent protection layer 131 after it is stacked, and provides easiness of removing the first transparent protection layer 131. The peelable layer 117 can be suitably used as a pollution preventing coat, and may be formed of fluorinated resin such as polytetrafluoroethylene, silicon based resin, or the like. Alternatively, acrylic or urethane based resin may be used if its water contact angle is not less than 93°.

Particularly, when the first transparent protection layer 131 having an adherent property is directly stacked on the electro-optical panel 110 and bonded with its adherent property, it is difficult to control the adherent property of the first transparent protection layer 131 of which the impact absorption is most importantly considered. Therefore, due to such a peelable layer 117, the transparent protector 130 can be easily removed, and the construction according to the invention is very useful from this viewpoint.

As described above, due to the peelable layer 117 provided on the electro-optical panel 110, it is possible to easily re-bond the transparent protector 130 even when the transparent protector 130 is deformed or its bonded location is misaligned. Additionally, if the transparent protector 130 is inappropriately bonded, it is possible to easily remove it and re-bond a new transparent protector to the electro-optical panel 110.

Figure 9:
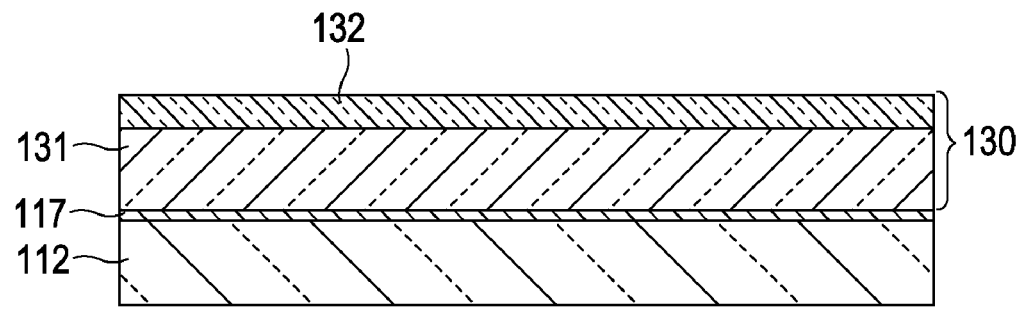
FIG. 9 is a schematic cross-sectional view illustrating a bonding structure between a transparent protector and an electro-optical panel according to another embodiment of the invention.

FIG. 9 illustrates a construction of an electro-optical panel 110, in which a polarization film 116 may be not necessarily provided. The electro-optical panel 110 may necessarily have the polarization film 116 as in a twisted nematic mode or a super twisted nematic mode, but may not necessarily have the polarization film 116 as in a polymer-dispersed type liquid crystal display unit or an electrophoresis display unit. When the polarization film 116 is not provided, the peelable layer 117 may be directly formed at the viewer side of the transparent panel 112 of the electro-optical panel 110 as shown in FIG. 9, and the transparent protector 130 (e.g., the first transparent protection layer 131) may be stacked thereon.

Figure 10:
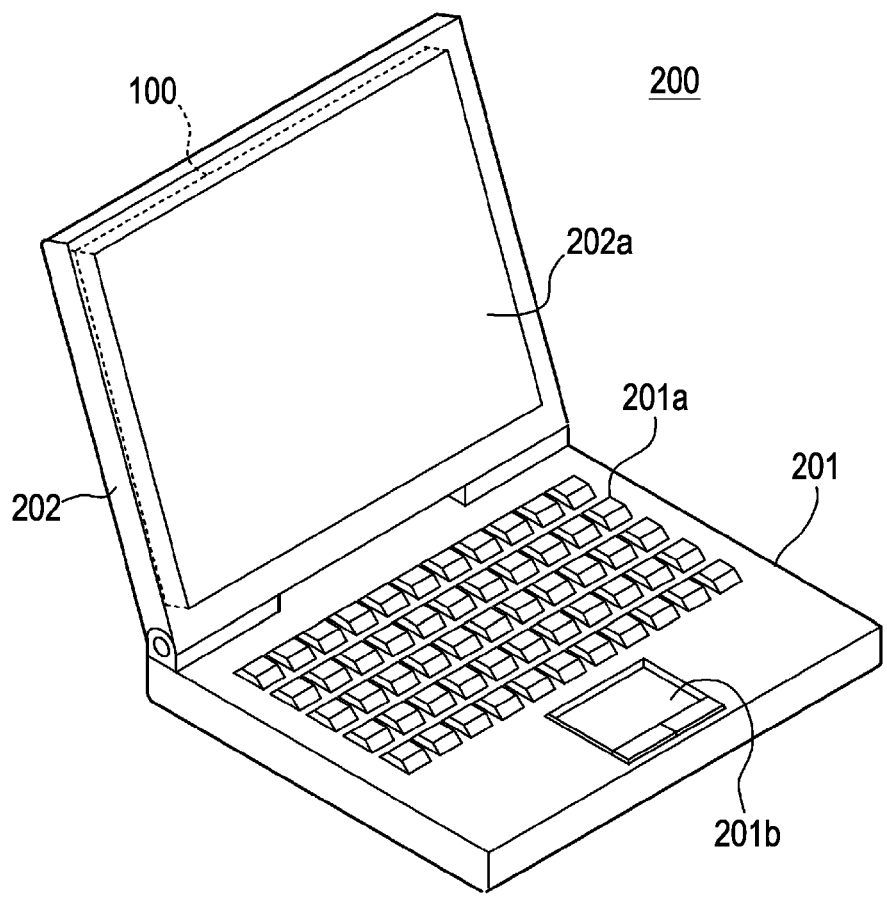
FIG. 10 is a schematic perspective view illustrating an electronic device according to an embodiment of the invention.

Finally, an exemplary electronic device having the aforementioned electro-optical module 100 will be described with reference to FIGS. 10 and 11. FIG. 10 illustrates a laptop computer as an electronic device according to an embodiment of the invention. The laptop computer 200 includes a main unit 201 having a plurality of manipulation buttons 201a or other manipulation tools 201b and a display unit 202 which is connected to the main unit 201 and has a display screen 202a. In FIG. 10, the main unit 201 and the display unit 202 are openably assembled with each other. The aforementioned electro-optical module (e.g., a liquid crystal display unit) 100 is incorporated into the display unit 202, so that a desired image can be displayed on the display screen 202a. In this case, a display control circuit is provided in the laptop computer 200 to control the electro-optical module 100. This display control circuit is constructed to transmit image signals, input data, or a predetermined control signal to the electro-optical module 100 in order to determine its display appearance.

Figure 11:
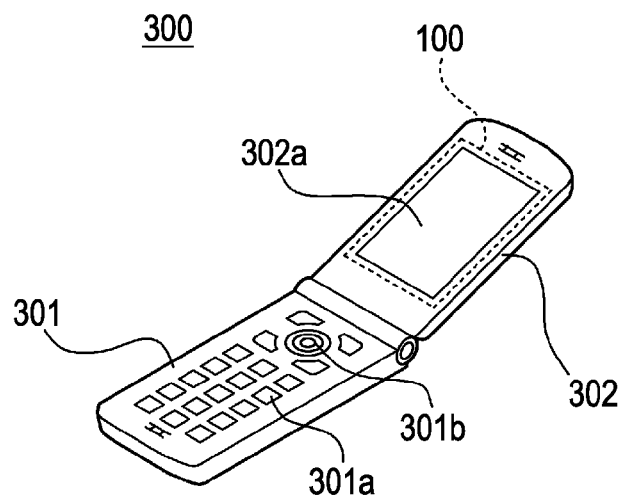
FIG. 11 is a schematic perspective view illustrating an electronic device according to another embodiment of the invention.

FIG. 11 illustrates a mobile phone as an electronic device according to another embodiment of the invention. The mobile phone 300 shown in FIG. 11 includes a manipulation unit 301 having a plurality of manipulation buttons 301a and 301b and a mouth piece, a display unit 302 having a display screen 302a and an ear piece. The aforementioned electro-optical module 100 is incorporated into the display unit 302. A display image formed by the electro-optical module 100 can be viewed through the display screen 302a of the display unit 302. In this case, a display control circuit is provided in the mobile phone 300 to control the electro-optical module 100. This display control circuit is constructed to transmit image signals, input data, or a predetermined control signal to the electro-optical module 100 in order to determine its display appearance.

While an electro-optical module and an electronic device according to the invention have been particularly shown and described with reference to exemplary embodiments thereof, it will be understood by those skilled in the art that various changes and modifications may be made therein without departing from the spirit and scope of the invention. For example, the invention can be applied to any type of electro-optical module if a transparent protector is provided in the electro-optical panel. Also, the invention is not limited to the shape of the chassis frame for fixing the electro-optical module as shown in FIG. 1.

What is claimed is:

1. An electro-optical module comprising:
   a chassis with an inner surface and defining an opening into the electro-optical module;
   an electro-optical panel having a first transparent panel and a second transparent panel, the first and second transparent panels disposed on opposite sides of the electro-optical panel, the electro-optical panel also including a first polarization film and a second polarization film, the first polarization film being disposed on and abutting an outer surface of the first transparent panel, the second polarization film being disposed on and abutting an outer surface of the second transparent panel; and
   a transparent protector disposed on and abutting the first polarization film of the electro-optical panel, the transparent protector abutting the inner surface of the chassis, the transparent protector extending across the opening of the chassis to be exposed externally via the opening, the transparent protector being disposed between the inner surface of the chassis and the first polarization film;
   wherein the transparent protector has a stack structure including only a first transparent protection layer and a second transparent protection layer, the first transparent protection layer abutting the first polarization film, the first transparent protective layer formed of an elastic material, the first transparent protection layer being disposed between the second transparent protection layer and the electro-optical panel, the first transparent protection layer being made of an adherent, gel-type material, the second transparent protection layer and the electro-optical panel adhering together via the first transparent protection layer, wherein a thickness of the first transparent protection layer is greater than a thickness of the second transparent protection layer by a ratio of the thickness of the first transparent protection layer to the thickness of the second transparent protection layer of at least 1.3, and wherein a dynamic elasticity value of the second transparent protection layer is at least ten times higher than a dynamic elasticity value of the first transparent protection layer within a frequency range of 1 to 10 Hz.

2. The electro-optical module according to claim 1, wherein impact resistance of the electro-optical panel is improved 20% or higher per a thickness of 0.1 mm of the transparent protector in comparison with that of the electro-optical panel which is not combined with the transparent protector.

3. The electro-optical module according to claim 1, wherein a dynamic elasticity value of the first transparent protection layer is ranged between 0.01 MPa and 0.1 GPa, and a dynamic elasticity value of the second transparent protection layer is ranged between 1.0 and 15.0 GPa within a frequency range of 1 to 10 Hz.

4. The electro-optical module according to claim 1, wherein the thickness of the first transparent protection layer is equal to a value of at most 0.8 mm, and the thickness of the second transparent protection layer is ranged between 0.1 mm and 0.5 mm.

5. The electro-optical module according to claim 1, wherein the thickness of the first transparent protection layer is not larger than 0.4 mm.

6. The electro-optical module according to claim 1, further comprising an illumination unit arranged at a rear of the electro-optical panel, wherein the illumination unit includes a light source, a light guide panel that introduces a light beam from the light source to output it through a light-emitting surface, and a prism sheet interposed between the light-emitting surface of the light guide panel and the electro-optical panel, and wherein the prism sheet has a prismatic structure protruded toward the light guide panel.

7. The electro-optical module according to claim 1, further comprising an illumination unit arranged at a rear of the electro-optical panel, wherein the illumination unit includes a light source, a light guide panel that introduces a light beam from the light source to output it through a light-emitting surface, and a prism sheet interposed between the light-emitting surface of the light guide panel and the electro-optical panel, and wherein a surface coat having higher hardness than that of the prism sheet is formed on at least an apex portion of the prism sheet.

8. The electro-optical module according to claim 1, further comprising a peelable layer that is formed between the electro-optical panel and the first transparent protection layer to easily remove the first transparent protection layer.

9. An electronic device comprising the electro-optical module according to claim 1 and a controller that controls the electro-optical module.

10. The electro-optical module according to claim 1, wherein a loss tangent of the first transparent protection layer is within a range of 0.10 to 0.25, wherein the loss tangent equals a lossy shear elasticity value of the first transparent protection layer divided by the dynamic elasticity of the first transparent protection layer.

11. An electro-optical module comprising:

a chassis with an inner surface and defining an opening into the electro-optical module;

an electro-optical panel having a first transparent panel and a second transparent panel, the first and second transparent panels disposed on opposite sides of the electro-optical panel, the electro-optical panel also including a first polarization film and a second polarization film, the first polarization film being disposed on and abutting an outer surface of the first transparent panel, the second polarization film being disposed on and abutting an outer surface of the second transparent panel; and a transparent protector disposed on and abutting the first polarization film of the electro-optical panel, the transparent protector abutting the inner surface of the chassis, the transparent protector extending across the opening of the chassis to be exposed externally via the opening, the transparent protector being disposed between the inner surface of the chassis and the first polarization film;

wherein the transparent protector has a stack structure including only a first transparent protection layer and a second transparent protection layer, the first transparent protection layer abutting the first polarization film, the first transparent protective layer formed of an elastic material, the first transparent protection layer being disposed between the second transparent protection layer and the electro-optical panel, the first transparent protection layer being made of an adherent, gel-type material, the second transparent protection layer and the electro-optical panel adhering together via the first transparent protection layer, wherein a dynamic elasticity value of the second transparent protection layer is at least ten times higher than a dynamic elasticity value of the first transparent protection layer within a frequency range of 1 to 10 Hz, and the dynamic elasticity value of the first transparent protection layer is ranged between 0.01 MPa and 0.1 GPa, and the dynamic elasticity value of the second transparent protection layer is ranged between 1.0 and 15.0 GPa within the frequency range of 1 to 10 Hz, wherein a thickness of the first transparent protection layer is greater than a thickness of the second transparent protection layer by a ratio of the thickness of the first transparent protection layer to the thickness of the second transparent protection layer of at least 1.3, and wherein the thickness of the first transparent protection layer is equal to a value of at most 0.8 mm, and the thickness of the second transparent protection layer is ranged between 0.1 mm and 0.5 mm.

12. The electro-optical module according to claim 11, wherein a loss tangent of the first transparent protection layer is within a range of 0.10 to 0.25, wherein the loss tangent equals a lossy shear elasticity value of the first transparent protection layer divided by the dynamic elasticity of the first transparent protection layer.

* * * * *